United States Patent
Gallant

(10) Patent No.: US 8,295,459 B2
(45) Date of Patent: Oct. 23, 2012

(54) SYSTEM AND METHOD FOR DYNAMICALLY PARTITIONING CONTEXT SERVERS

(75) Inventor: John Kenneth Gallant, Plano, TX (US)

(73) Assignee: Verisign, Inc., Reston, VA (US)

( * ) Notice: Subject to any disclaimer, the term of this patent is extended or adjusted under 35 U.S.C. 154(b) by 1686 days.

(21) Appl. No.: 11/620,765

(22) Filed: Jan. 8, 2007

(65) Prior Publication Data

US 2008/0063165 A1   Mar. 13, 2008

Related U.S. Application Data

(63) Continuation-in-part of application No. 11/509,037, filed on Aug. 24, 2006.

(51) Int. Cl.
*H04M 15/00* (2006.01)
(52) U.S. Cl. .............. 379/133; 379/112.01; 379/134
(58) Field of Classification Search ............ 379/112.01, 379/112.02, 114.28, 114.29, 133, 134, 121.05, 379/126
See application file for complete search history.

(56) References Cited

U.S. PATENT DOCUMENTS

| | | | |
|---|---|---|---|
| 5,802,058 A * | 9/1998 | Harris et al. .................. | 370/410 |
| 5,832,225 A * | 11/1998 | Hacherl et al. ................ | 709/223 |
| 5,896,441 A | 4/1999 | Akazawa et al. | |
| 5,933,474 A | 8/1999 | Kipp | |
| 6,205,557 B1 | 3/2001 | Chong et al. | |
| 6,279,046 B1 * | 8/2001 | Armstrong et al. .............. | 710/5 |
| 6,393,415 B1 | 5/2002 | Getchius et al. | |
| 6,408,063 B1 | 6/2002 | Slotte et al. | |
| 6,470,081 B1 * | 10/2002 | Sbisa et al. ............... | 379/221.09 |
| 6,539,082 B1 | 3/2003 | Lowe et al. | |
| 6,658,099 B2 * | 12/2003 | Perkins, III .............. | 379/112.01 |
| 6,718,022 B1 | 4/2004 | Ehrlich et al. | |
| 6,731,730 B1 | 5/2004 | Zolotov | |
| 6,760,426 B2 | 7/2004 | Sbisa et al. | |
| 6,768,793 B1 | 7/2004 | Sbisa et al. | |
| 6,801,949 B1 * | 10/2004 | Bruck et al. ................. | 709/232 |
| 6,920,320 B2 | 7/2005 | Rathunde et al. | |
| 7,209,964 B2 | 4/2007 | Dugan et al. | |
| 7,321,925 B2 * | 1/2008 | Trethewey .................... | 709/219 |
| 7,529,356 B2 | 5/2009 | Cooke et al. | |
| 7,583,794 B1 | 9/2009 | Croak et al. | |
| 7,664,823 B1 * | 2/2010 | Wakerly ....................... | 709/211 |
| 2002/0064149 A1 | 5/2002 | Elliott et al. | |
| 2002/0161804 A1 | 10/2002 | Chiu et al. | |

(Continued)

FOREIGN PATENT DOCUMENTS

| | | |
|---|---|---|
| WO | WO 98/34419 | 8/1998 |
| WO | WO 01/60102 | 8/2001 |
| WO | WO 2008/024156 | 2/2008 |

OTHER PUBLICATIONS

Examiner's first report on Australian Patent Application No. 2008204949, dated Apr. 9, 2010, from Australian Patent Office (2 pages).

(Continued)

*Primary Examiner* — Binh Tieu
(74) *Attorney, Agent, or Firm* — Finnegan, Henderson, Farabow, Garrett & Dunner, LLP

(57) ABSTRACT

A system and method for dynamically partitioning context servers in a network in response to changes in network conditions. Context servers store information about calls in a telecommunications system. Network control elements can obtain call information from one or more partitions of the context servers to help make call control and reporting decisions.

20 Claims, 8 Drawing Sheets

U.S. PATENT DOCUMENTS

| | | | |
|---|---|---|---|
| 2003/0191752 A1* | 10/2003 | Fairweather | 707/3 |
| 2004/0001517 A1 | 1/2004 | Lamberton et al. | |
| 2005/0216421 A1 | 9/2005 | Barry et al. | |
| 2005/0240621 A1 | 10/2005 | Robertson et al. | |
| 2005/0281399 A1 | 12/2005 | Moisey et al. | |
| 2006/0002534 A1 | 1/2006 | Lang et al. | |
| 2006/0173929 A1 | 8/2006 | Wilson | |
| 2006/0182256 A1* | 8/2006 | Sbisa et al. | 379/221.01 |
| 2008/0063158 A1 | 3/2008 | Gallant | |
| 2009/0165003 A1* | 6/2009 | Jacobson et al. | 718/102 |
| 2010/0257235 A1* | 10/2010 | Abbott et al. | 709/203 |

OTHER PUBLICATIONS

International Search Report and Written Opinion, cited in related International Application No. PCT/US08/50510, May 20, 2008.

Supplementary European Search Report corresponding to the EP 08727427 application.

Examiner's second report on Australian Patent Application No. 2008204949, dated May 4, 2010, from Australian Patent Office (3 pages).

* cited by examiner

SYSTEM AND METHOD FOR DYNAMICALLY PARTITIONING CONTEXT SERVERS

CROSS-REFERENCE TO RELATED APPLICATIONS

This application is a continuation-in-part of U.S. patent application Ser. No. 11/509,037, filed Aug. 24, 2006,, the entire contents of which are incorporated herein by reference.

BACKGROUND OF THE INVENTION

Modern telecommunication networks provide services based on call signaling. The network signaling protocol includes a service layer upon which many of the provided services are implemented. Such services include 1-800 and toll free calling, calling cards, private virtual networks, cellular registration and roaming, prepaid calling, etc.

FIG. 1 is a diagram of such a call signaling-based telecommunication network. The network includes one or more telecommunication switches 110-1 through 110-m, a signaling system 120, and one or more network control elements 130-1 through 130-n. The telecommunication switches 110 are responsible for connecting and disconnecting a telephone call and are primary originators of call signals (or call messages) during the life of the call. Typically, call signals indicate the call status, e.g., connected, disconnected, busy, forwarded, answered, timed out, etc., or include a command, e.g., update the call's status, start or stop tolling the call, bill the call, etc., to be executed by another network component with regard to the call. The signaling system 120 routes the call signals and other signals between the switches 110 and the network control elements 130. The signaling system 120 may include an intermediary routing node (not shown) that routes signals to the designated switch or control element. The network control elements 130 are responsible for providing the services on the network. The control elements 130 receive and process call signals from the switches 110 and implement the services based on the processed call signals.

An example of a call signaling-based telecommunication network is the Signaling System 7, (SS7) network. The SS7, network includes telecommunication switches called mobile switching centers (MSC), which are used primarily in mobile telephone networks. The SS7, network includes a signaling system to route call signals using a signal transfer point (STP) as an intermediary routing node. The SS7, network also includes network control elements called mobile service control points (SCP), which provide the mobile services on the network.

One call typically generates several call signals during the life of the call. As such, the network control elements should be able to tie together all the call signals in order to reliably provide the services associated with the call.

One commonly used method involves the originator of the call signal, i.e., the telecommunication switch, populating the header of the call signal with a string identifying the network control element to which the call signal is to be routed for processing. An intermediary routing node on the network examines the string, consults a routing table to identify the destination network control element, and then routes the call signal to the identified control element. Hence, all the call signals for the call have the same identifying string, such that the routing node routes all the call signals for that call to the same control element. The identified network control element is then able to tie together all the call signals for that call with little effort.

In reality, however, multiple originators generate call signals for the same call in a network. Some of the originators use headers with different formats or different identifying strings, as in certain prepaid services. While other originators do not use headers at all. As such, the intermediary routing node may not reliably identify the appropriate destination network control element and properly route all the call signals for the call thereto.

A common solution to the header problem has been to use only one network control element to process all call signals for all calls, with the remaining control elements as backups if the one element fails. The primary control element then gets all the call signals from different originators and uses an appropriate method to identify and tie together those call signals belonging to the same call. If the primary element fails, one of the backup elements then takes over and receives all the call signals.

This solution, however, is not very efficient because several of the control elements are idle and are only used when there is a primary element failure, while the primary control element works constantly. Moreover, after sitting idle, there is no guarantee that a backup control element could take over and operate properly, in the event of a primary element failure.

A solution to the idleness problem has been to use the primary network control element with a live redundant backup network control element at the same geographic site that runs concurrently therewith. As such, if the primary element fails, the backup element is already running and can take over seamlessly without delay.

This solution, however, is also not very efficient because of the duplicated work by the control elements, such that the backup element's processing power is wasted when it could be used to process other call signals.

A solution to the problems associated with using only one network control element or using a primary control element with a live redundant backup is described in related U.S. application Ser. No. 11/509,037, which involves adding context servers to the telecommunication network to provide context information to the network control elements about the call signal that the control element is currently processing. The context information may come from the call's previously processed call signals that are stored in the context servers. Any network control element may access one or more of the context servers to store call signals and/or context information for the call that the control element processed. Any network control element may also access one or more of the context servers to retrieve previously processed call signals and/or context information for the call, where the previously processed call signals were processed by either the retrieving or any other control element. As such, any network control element can reliably process a current call signal for a call without having received and/or processed any preceding call signals for that call.

This allows each network control element to be a redundant backup for other control elements, yet process different call signals concurrently. Moreover, the number of redundant control elements may be arbitrarily large. Furthermore, these network control elements need not reside at the same geographic site. This level of redundancy advantageously provides a highly reliable network.

A context server's context information about a previously processed call signal for a call may include the time the call was connected, disconnected, busy, forwarded, answered, timed out, etc., the calling and called telephone numbers, the amount of prepaid funds available for the call, the number of minutes remaining in a prepaid call, the billing address of the calling party, etc.

For example, suppose a call is connected at 2:00 PM. The call signal to update the status of the call to "connect" is processed by control element A. When the call disconnects, the call signal to update the status of the call to "disconnect" is received by control element B. In order to update the status of the correct call, control element B must have context information about the call. Therefore, control element B must determine what call signals went before and what they meant. This may be done by control element B accessing context servers to get the context information of the "connect" call signal, e.g., the calling number in the connected status. From this information, control element B may reliably change the calling number to the disconnected status.

All or some of the context servers may be responsible for a particular set of calls, call signals, and context information. As such, a network control element may access only those context servers responsible for the particular call that the control element is currently processing.

However, in some instances, there may be no particular basis upon which the context servers are given responsibility, e.g., server capacity, sever utilization, network traffic, etc., which could then result in load imbalance. Or, during network operation, a new network condition may occur that leads to network inefficiency, in which some or all of the context servers are either over-utilized or under-utilized. Until the network condition changes, the context servers may operate inefficiently.

Accordingly, there is a need in the art for a system and method for dynamically partitioning the context servers during network operation into partitions having one or more context servers therein in order to maintain efficiency.

DETAILED DESCRIPTION

Figure 1:
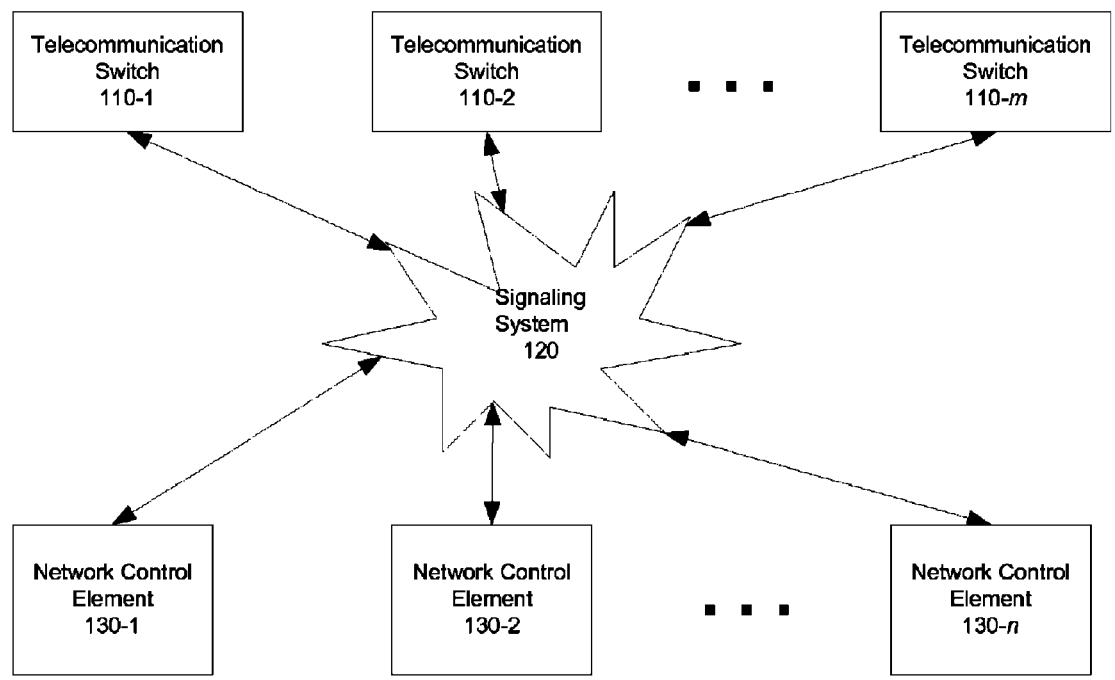
FIG. 1 is a diagram of a prior art telecommunication network.

For a call signaling-based telecommunication network to operate efficiently, the network should be able to partition the context servers to respond to changes in network conditions that may result in inefficiency, e.g., high latency, high processor utilization, low memory space, bandwidth constraints, etc. To do this, according to embodiments of the present invention, during network operation, the network may dynamically partition the context servers. This can advantageously provide faster context information access, load balancing among the context servers, and reduced context information redundancy, thereby contributing to the high reliability of the network. All of the network's context servers need not store redundant information and network components need not have access to all of the context servers for context information.

Embodiments of the present invention are directed to dynamic context server partitioning in call signaling-based networks. The present invention can advantageously enable a network to partition its context servers in real-time to respond to changes in network conditions and still reliably provide access to the context servers by network control elements for context information.

In one embodiment, a method may include determining which partition of context servers to which to send call data based on the data key of the call and, based on the determination, sending the call data to the context servers in the determined partition.

In another embodiment, a method may include determining which partition of context servers from which to request context information about a call based on the data key of the call and, based on the determination, sending a request for context information to the context servers in the determined partition.

In still another embodiment, a method may include, in response to a change in network condition, partitioning context servers, where each partition includes one or more of the context servers, generating a partitioning table to map the partition with the context servers therein, and providing partitioning logic based on a call data key to determine which partition to access. A change in network condition may include, e.g., servers in a partition becoming overloaded, other servers in other partitions being underutilitzed, an adverse network condition interfering with communications with servers in one or more partitions, etc. Often a new partitioning can be triggered by the change in network condition.

When a change in network condition occurs, the method may partition the context servers in several ways. One way may be by keeping the number of context servers constant, but increasing or decreasing the number of partitions. This can be advantageous when certain partitions are consistently underutilized, such that their context servers may be moved to heavily utilized partitions. Another way may be by keeping the number of partitions constant, but by increasing or decreasing the number context servers in the network. This can also be advantageous when the network is either underutilized or overutilized. Still another way may be by keeping the number of partitions and the number of context servers constant, but by changing the allocation of particular servers among the partitions. This can be advantageous when the context servers are not all of the same kind, but rather where some context servers are more or less capable than others. The overall capacity of a partition can be increased by adding servers and/or by moving a less capable server out of the partition and a more capable server into the partition. Likewise, the overall capacity of a partition can be reduced by moving a more capable server out of the partition and by moving a less capable server into the partition. A server may be more capable if it has, e.g., more processing power, more memory, more ports, etc., than another, less capable server.

In another embodiment, a method may include receiving a call signal for a call from a telecommunications switch, determining to which partition of context servers to send a request for context information about a previously processed call signal for the call, and sending the request for information to the determined partition. The method may further include receiving context information back from the context servers in the determined partition and processing the call signal based on the received context information.

In still another embodiment, a system may include context servers to provide context information, a central server to partition the context servers in response to a change in network condition, and one or more control elements to select a partition and access the context servers in the partition for context information.

Figure 2:
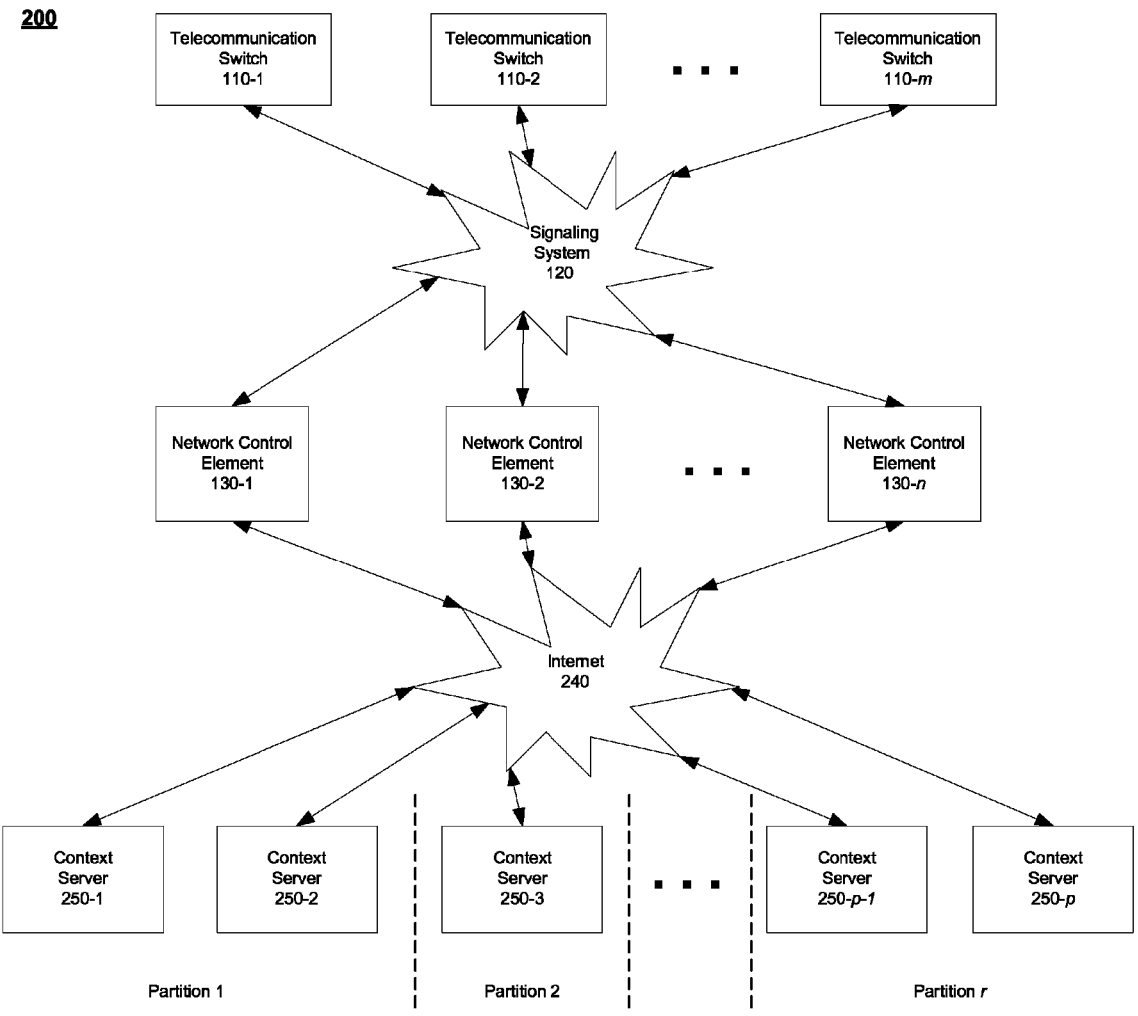
FIG. 2 is a diagram of a telecommunication network for implementing an embodiment of the present invention.

FIG. 2 is a diagram of a telecommunication network for implementing an embodiment of the present invention. The network 200 may include telecommunication switches 110-1 through 110-m, and network control elements 130-1 through 130-n, connected by signaling system 120. The network 200 may further include context servers 250-1 through 250-p, connected to the network control elements 130 via network (e.g., Internet (shown), Local Area Network, intranet, extranet, etc.) 240. The context servers may be partitioned into partitions 1 through r, where each partition includes one or more of the context servers. None of the network components need reside in the same physical location, but may form a distributed network.

The telecommunication switches 110, the network control elements 130, and the signaling system 120 perform as described above regarding FIG. 1.

In an embodiment, an intermediary routing node (not shown) in the signaling system 120 may distribute the call signals originating at the switches 110 between the control elements 130 in a balanced manner. The signals may be distributed by a simple round-robin method. Alternatively, the signals may be distributed by a weighting algorithm according to control element processing capability. Any other method capable of providing a balanced call signal distribution may be used. When a network control element is not available or has failed, the routing node may skip that element when distributing the call signals. After the element becomes available or is repaired, the routing node may resume call signal distribution thereto.

Context servers 250 in a particular partition may receive and store call signals from the network control elements 130 for which that partition is responsible. Context servers 250 in a particular partition may further retrieve stored call signals and/or information pertaining thereto and forward the same back to the network control elements 130 upon receipt of a request for context information from a network control element 130. The context servers 250 may be any general purpose computer or like device and software capable of performing all or part of the method according to embodiments of the present invention.

Figure 3:
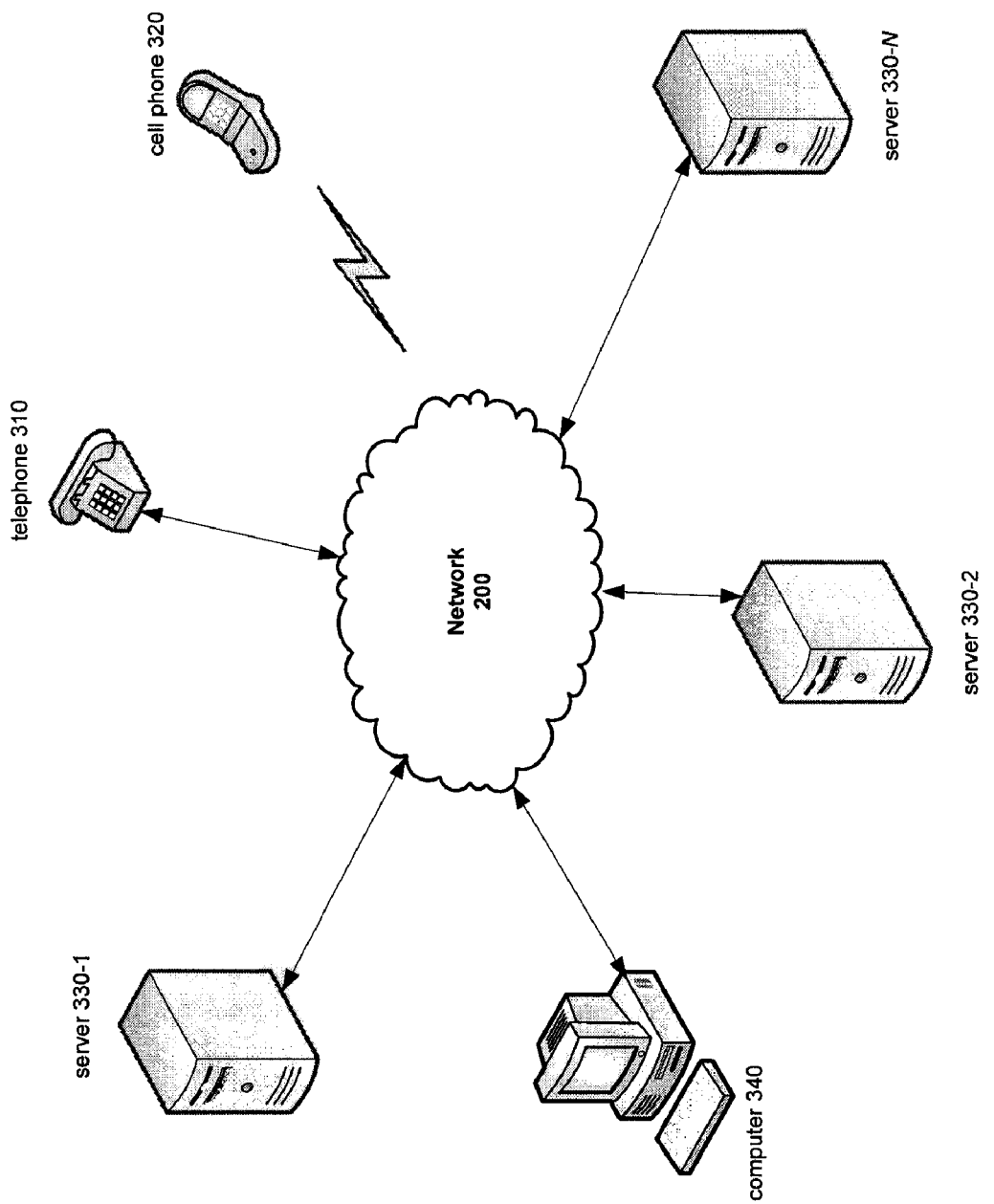
FIG. 3 is a diagram of a telecommunication system for implementing an embodiment of the present invention.

FIG. 3 is a diagram of a telecommunication system for implementing an embodiment of the present invention. The system may include telephones 310, cell phones 320, network computers 340, and network servers 330-1 through 330-N, connected via network 200 as described above with regard to FIG. 2. The telephones 310 and cell phones 320 may connect to the network 200 via the telecommunication switches 110. The network computers 340 may provide internet telephony and/or data transmission and connect to the network 200 through the internet 240. The network servers 330 may provide internet service through which internet telephony, worldwide web connection, and/or data transmission may be made. The network servers 330 may connect to the network 200 through the internet 240. The network 200 may be capable of handling wired, wireless, and/or Internet telephony.

A caller may place a call on the telephone 310, the cell phone 320, or the computer 340. A call may also be forwarded from the servers 330. The call may then be connected via the network 200. During the life of the call, call signals may be generated by the telecommunication switch 110 about the status of the call or to command the network 200 or any network component to perform some operation related to the call.

Figure 4:
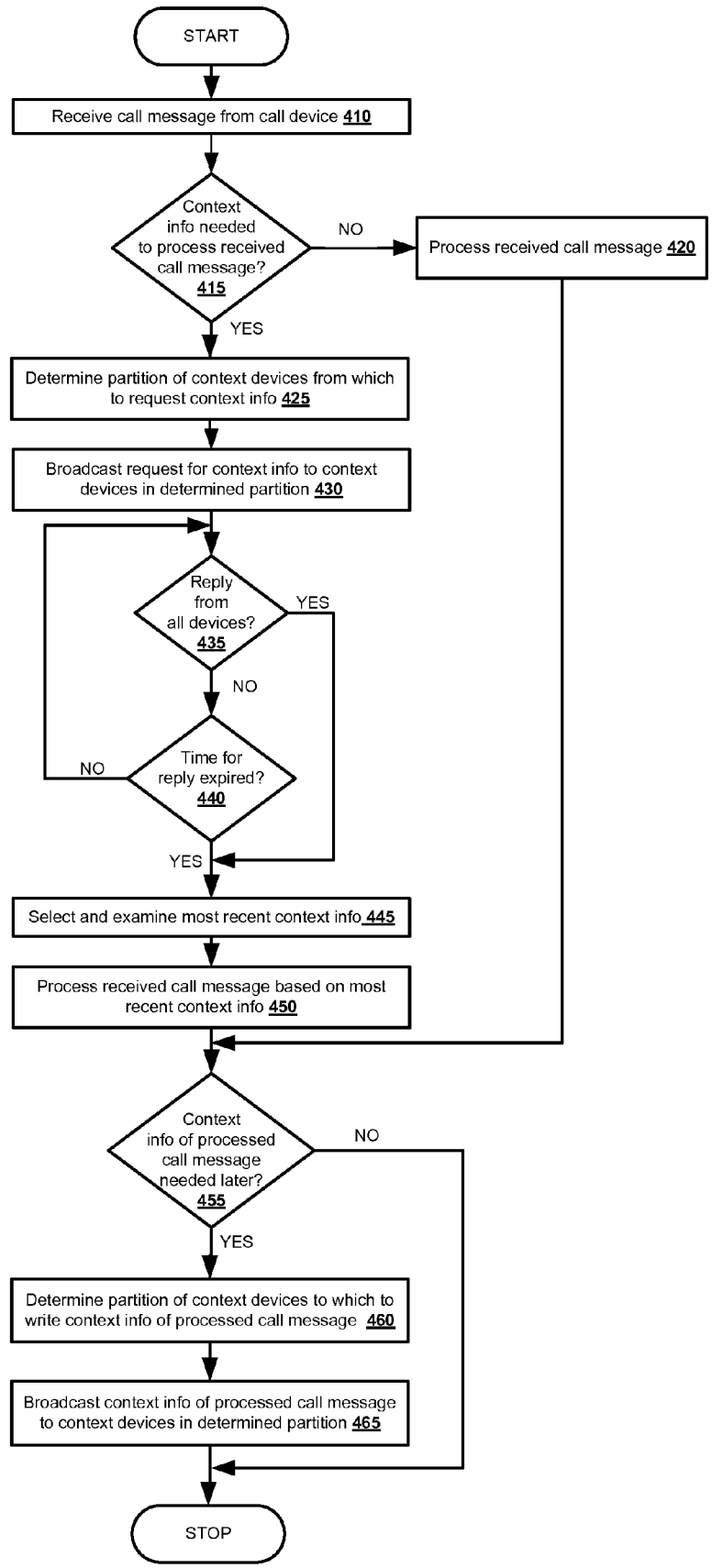
FIG. 4 is a flowchart of a method in accordance with an embodiment of the present invention.

FIG. 4 is a flowchart of a method for processing a call signal using context information from a partition of context servers according to an embodiment of the present invention. In order to tie together call signals that are associated with the same telephone call but received at different times by different network control elements, each network control element may be capable of sending a request for context information to and receiving the requested information back from one or more context servers in a particular partition.

A network control element may receive (410) a call signal from a telecommunication switch. The network control element may then determine (415) whether context information is needed in order to process the call signal. If context information is not needed, the network control element may then process (420) the call signal. An example of when the network control element may not need context information is when the control element can reliably tie the signals together, e.g., when the headers of the call signals consistently include control element identifiers because the same control element receives all the call signals associated with the call. The network control element also may not need context information to process the first call signal in a call.

After processing the call signal (420), the network control element may determine (455) whether the processed call signal and/or its context information is to be used later, e.g., either during the current call for context processing of a subsequent call signal or after the current call ends to update the call context for later tracing. If so, the network control element may determine (460) which partition of context servers to which to write the processed call signal and/or its context information. A method for making this determination will be discussed below in FIG. 7. After determining which partition to write to, the network control element may then broadcast (465) the processed call signal and/or its context information to context servers in the determined partition for storage. Alternatively, the network control element may multicast or otherwise send the processed call signal and/or context information to the context servers in the determined partition for storage.

If the processed call signal and/or its context information is not to be used later (455), the network control element may omit the partition determining (460) and call signal/context information broadcasting (465).

If context information is needed to process the received call signal (415), the network control element may determine (425) which partition of context servers from which to read context information about the call signal. A method for making this determination will be discussed below in FIG. 7. The network control element may broadcast (430) (or multicast or otherwise send) a request for context information about the call signal to the context servers in the determined partition. The request may include a data key, e.g., a telephone number, billing account number, etc., which identifies the call.

After sending the request for context information, the network control element may wait (435) for replies from all or some the context servers in the determined partition, where the replies include the requested context information that matches the data key of the current call signal. This match indicates that the context information and the current call signal are associated with the same call. The context information may include a previously processed call signal and/or information about the previously processed signal. Information about the call signals may include the data key, the timestamp, i.e., the time that the call signal was originally received by a network control element from a telecommunication switch, the nature of the signal, e.g., whether it is a disconnect, connect, status, etc., signal, and so on.

If the network control element does not receive replies from all the context servers in the determined partition within a specified time period (440), the network control element may stop waiting and examine the replies received within the time period. On the other hand, if the network control element receives replies from all the context servers in the determined partition before the time period expires (435), the network control element may stop waiting and proceed to examine the replies. Any appropriate method of selecting among one or more replies to consider is encompassed by the present invention.

The network control element may select (445) the received context information that has the most recent timestamp. This is because this context information may reflect the most recent status and activity of the call. As such, the current call signal may logically follow the signal to which the context information pertains, thereby efficiently narrowing the possibilities of what the current call signal means.

The network control element may then process (450) the current call signal based on the selected context information. If the processed call signal and/or its context information is to be used later (455), as discussed above, the network control element may determine (460) which partition of context servers to which to write the processed call signal and/or its context information. The network control element may broadcast (465) (or multicast or otherwise send) the processed call signal and/or its context information to the context servers in the determined partition for storage.

If the processed call signal and/or its context information is not to be used later (455), the network control element may omit the partition determining (460) and the call signal/context information broadcasting (465).

Figure 5:
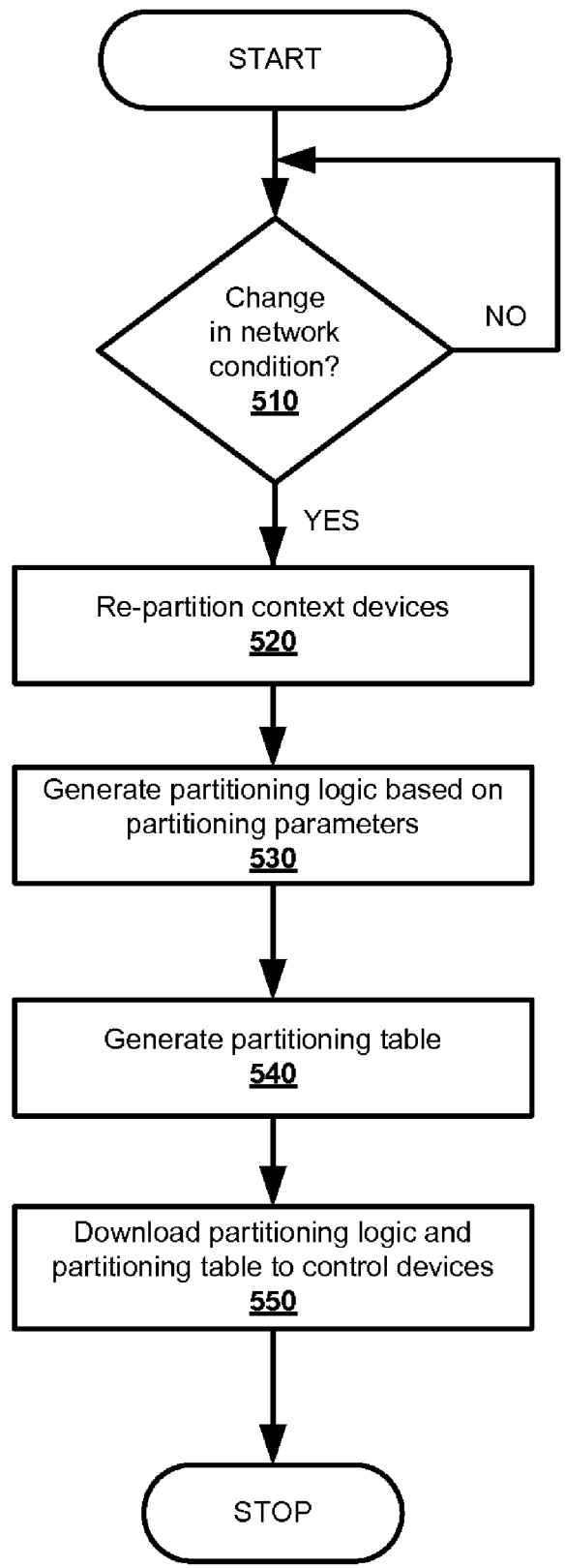
FIG. 5 is a flowchart of a method in accordance with another embodiment of the present invention.

FIG. 5 is a flowchart of a method for dynamically partitioning context servers according to an embodiment of the present invention. The central server may determine (510) whether a change in network condition has occurred, is occurring, or about to occur. The central server may make this determination based on an input from the network administrator of a change in network condition. Alternatively, the central server may make this determination based on its monitoring of network indicators, sending a signal to the network administrator, and receiving an acknowledgment from the network administrator of a change in network condition. Or, the central server may make this determination based on its monitoring of network indicators and calculating a change in network condition. Other ways of making such a determination are encompassed by the present invention.

If there is no change in network condition (510), the central server may continue to wait until there is.

If, however, there is a change in network condition (510), the context servers may be re-partitioned (520) via the central server. The network administrator may program the central server with the configuration of the partitions and the context servers therein. Or the central server may automatically generate the partitions and assign the context servers therein. The context servers may be partitioned in sequential order, where context servers A-C belong to partition 1, servers D-F belong to partition 2, and so on. Or the context servers may be partitioned in geographical order, where context servers in location A belong to partition 1, servers in location B belong to partition 2, and so on. Or the context servers may be partitioned based on network services, where context servers that provide context information for 1-800, or toll calling belong to partition 1, servers that provide context information for prepaid calling belong to partition 2, and so on. Or the context servers may be partitioned based on server capabilities. These partitioning strategies are meant to illustrate and not to limit the scope of the present invention. Those of skill in the art will recognize that a wide range of other partitioning strategies may be applied as appropriate to the situation at hand.

If there is a change in network condition, during re-partitioning, new context servers may be added to the network, existing context servers may be removed from the network, or existing context servers may be re-assigned to different partitions, depending on how best to address the change in network condition.

After establishing the partitions, the network administrator may assign a partition responsibility for a particular set of calls, e.g., via the central server. Or the central server may automatically make the assignments. For example, each partition may be responsible for a different network service or a different range of telephone numbers or a different geographical location from which calls originate, etc. As such, some call parameter in the call signals, e.g., a call signal data key, a telephone number exchange, a call originator identifier, etc., may be used to differentiate between the different sets of calls, thereby determining which is the responsible partition.

Accordingly, partitioning logic may be generated (530) to determine which partition will be accessed based on the call parameter in the call signals. The partitioning logic may be a deterministic mathematical function that calculates a partition number for the partition a network control element accesses based on the call parameter. The network administrator may program the central server with the partitioning logic. Or the central server may automatically generate the partitioning logic.

A partitioning table corresponding to the partitioning logic may then be generated (540) to map a partition number with each partition and the context servers in that partition. The network administrator may program the central server with the partitioning table. Or the central server may automatically generate the partitioning table.

The central server may download (550) the partitioning logic and the partitioning table to the network control elements to be executed by the control elements to determine which partition to access regarding context information.

When a network control element executes the partitioning logic, the logic output may indicate the partition number of the partition that the control element should access either to request context information regarding the call signal the element is currently processing or to send the processed call signal and/or context information. The control element may then look up, in the partitioning table, the context servers in the partition corresponding to that partition number.

Examples of changes in network conditions that may support real-time context server re-partitioning include bandwidth underflow or overflow, load imbalance, memory undercapacity or overcapacity and/or other such network conditions. Network indicators include low network latency, which may indicate bandwidth constraints or server overuse; high processor utilization, which may indicate bandwidth constraints or full memory; and excessive memory searches, which may indicate full memory. These and other network indicators may signal conditions that could result in inefficient and ineffective network operation, thereby supporting re-partitioning of the context servers in real-time.

It is to be understood that changes to network conditions are not limited to those described herein, but may include any change in network condition that supports real-time context server re-partitioning, which may improve efficiency and/or effectiveness of network operation.

When re-partitioning occurs, new partitioning logic and a new partitioning table may replace the existing logic and table.

Figure 6:
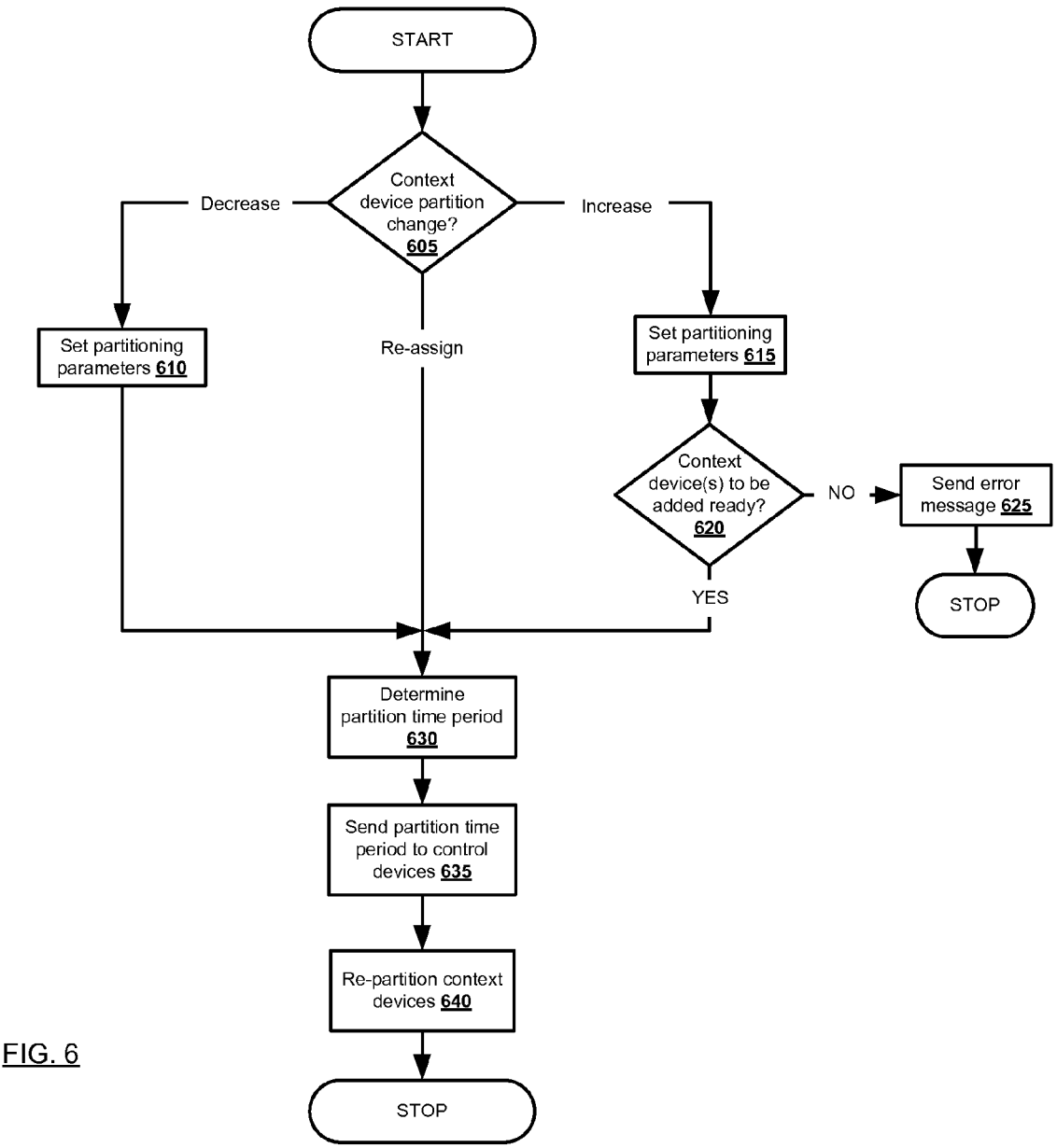
FIG. 6 is a flowchart of a method in accordance with yet another embodiment of the present invention.

FIG. 6 is a flowchart of a method for determining the amount of time, i.e., the time period, for dynamically partitioning context servers according to an embodiment of the present invention. The central server may determine (605) whether the context servers are to be re-partitioned to either increase or decrease the number of partitions or re-assign one or more servers to different partitions.

If the number of partitions is to decrease, the central server may set (610) the partitioning parameters, which may be used by the partitioning logic to dynamically determine which new partition of context servers the control element will access for context information. Examples of partitioning parameters include, without limitation, the existing number of partitions, X, the new number of partitions, Y, the call signal data key, K, the existing number of context servers A, and the new number of context servers, B. X may be either greater than or less than Y by 1, or more. A may be equal to B or greater than or less than B by 1, or more. Examples of partitioning logic will be discussed below.

After setting partitioning parameters (610) for a decreased number of partitions, the central server may determine (630) the amount of time, i.e., the partitioning time period, the central server may need to re-partition the context servers. The time period may be determined based on the magnitude of the change in the number of partitions, how many context servers are to be assigned or re-assigned, the central server's current load, etc.

If the number of partitions is to increase, the central server may set (615) the partitioning parameters, as described above, for an increased number of partitions. The central server may determine (620), if new context servers are to be added to the network, whether the new context servers are ready for service. If the new context servers are not ready, the central server may send (625) an error message to the network administrator and then stop the re-partitioning. After the new context servers are ready, the re-partitioning may restart in response to a signal from the network administrator and/or the network.

If the new context servers are ready or new servers are not to be added, the central server may determine (630) the time period the central server may need to re-partition the context servers, as described above.

If the number of partitions is to remain the same, but one or more of the context servers is to be re-assigned to different partitions, the central server may determine (630) the time period that central server may need to re-partition the context servers, as described above.

After determining the partitioning time period, the central server may send (635) the determined time period to the network control elements, which may then use the sent time period along with the partitioning logic and tables, as described below in FIG. 7.

The central server may then re-partition (640) the context servers.

Figure 7:
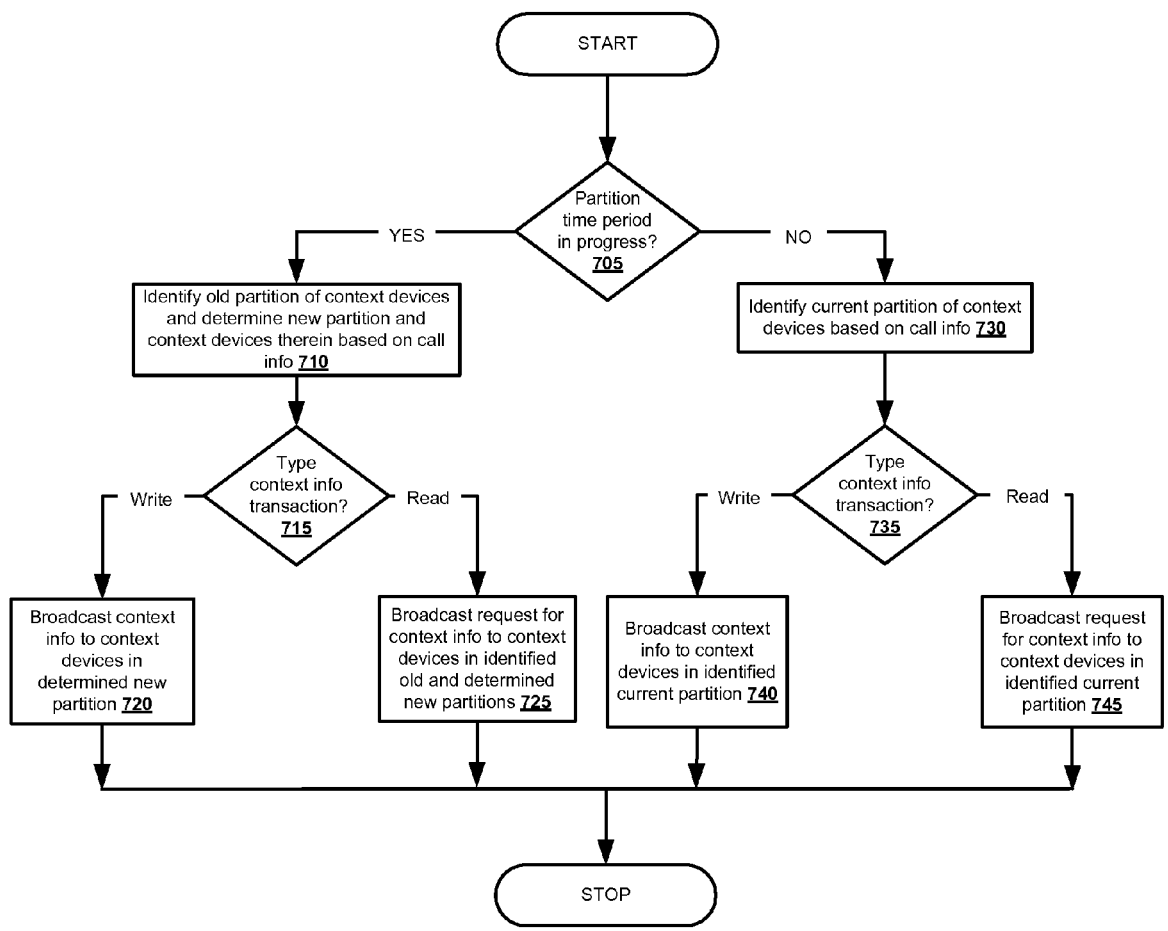
FIG. 7 is a flowchart of a method in accordance with still another embodiment of the present invention.

FIG. 7 is a flowchart of a method for determining which partition of context servers to access regarding context information according to an embodiment of the present invention. A network control element may determine (705) whether the partitioning time period is in progress, i.e., whether the central server is currently re-partitioning the context servers.

If a re-partitioning is in progress, the network control element may identify (710) the pre-re-partitioning ("old") partition and the context servers therein to use, based on the current call signal's information, e.g., the call signal data key K, by executing the old partitioning logic and looking up the old partitioning table. The network control element may also determine (710) the post-re-partitioning ("new") partition and the context servers therein, based on the current call signal's information, e.g., the call signal data key K, by executing the new partitioning logic and looking up the new partitioning table. By determining both old and new partitions, the network control element may ensure that it does not miss any of the context servers having relevant context information during a re-partitioning.

The network control element may determine (715) whether the transaction to perform regarding context information for the current call signal is a "broadcast-write" or a "broadcast-read." If a "broadcast-write," the network control element may broadcast (720) the current call signal and/or its context information to the context servers in the determined new partition. If a "broadcast-read," the network control element may broadcast (725) a request for context information to the context servers in both the identified old partition and the determined new partition.

If a re-partitioning is not in progress, the network control element may identify (730) the current partition of context servers to use, based on the current call signal's information, e.g., the call signal data key K, by executing the current partitioning logic and looking up the current partitioning table. The network control element may determine (735) whether the transaction to perform regarding context information for the current call signal is a "broadcast-write" or a "broadcast-read." If a "broadcast-write," the network control element may broadcast (740) the current call signal and/or its context information to the context servers in the identified current partition. If a "broadcast-read," the network control element may broadcast (745) a request for context information to the context servers in the identified current partition.

An example of partitioning logic is the following modulus algorithm. If a "broadcast-write," to determine in which partition of context servers, corresponding to partition number P, to store information, the network control element may calculate $P = K \bmod Y+1$,, where K is the call signal data key and Y is the number of new partitions. The network control element may then look up, in the partitioning table, the partition corresponding to the calculated partition number P. If a "broadcast-read," to determine to which partition of context servers, corresponding to partition number P, to send a request for information, the network control element may calculate $P_{old} = K \bmod X+1$, and $P_{new} = K \bmod Y+1$, where X is the number of old partitions. The network control element may then look up, in the old partitioning table, the old partition corresponding to the calculated old partition number $P_{old}$. Similarly, the network control element may look up, in the new partitioning table, the new partition corresponding to the calculated new partition number $P_{new}$.

The above example illustrates partitioning logic and the corresponding partitioning table when the existing context servers are re-partitioned or re-assigned. It is to be understood that partitioning logic and the corresponding partitioning table may be generated when the number of context servers increases or decreases.

The network control elements may alternatively multicast or directly send context information or requests for context information to the partitioned context servers.

Figure 8:
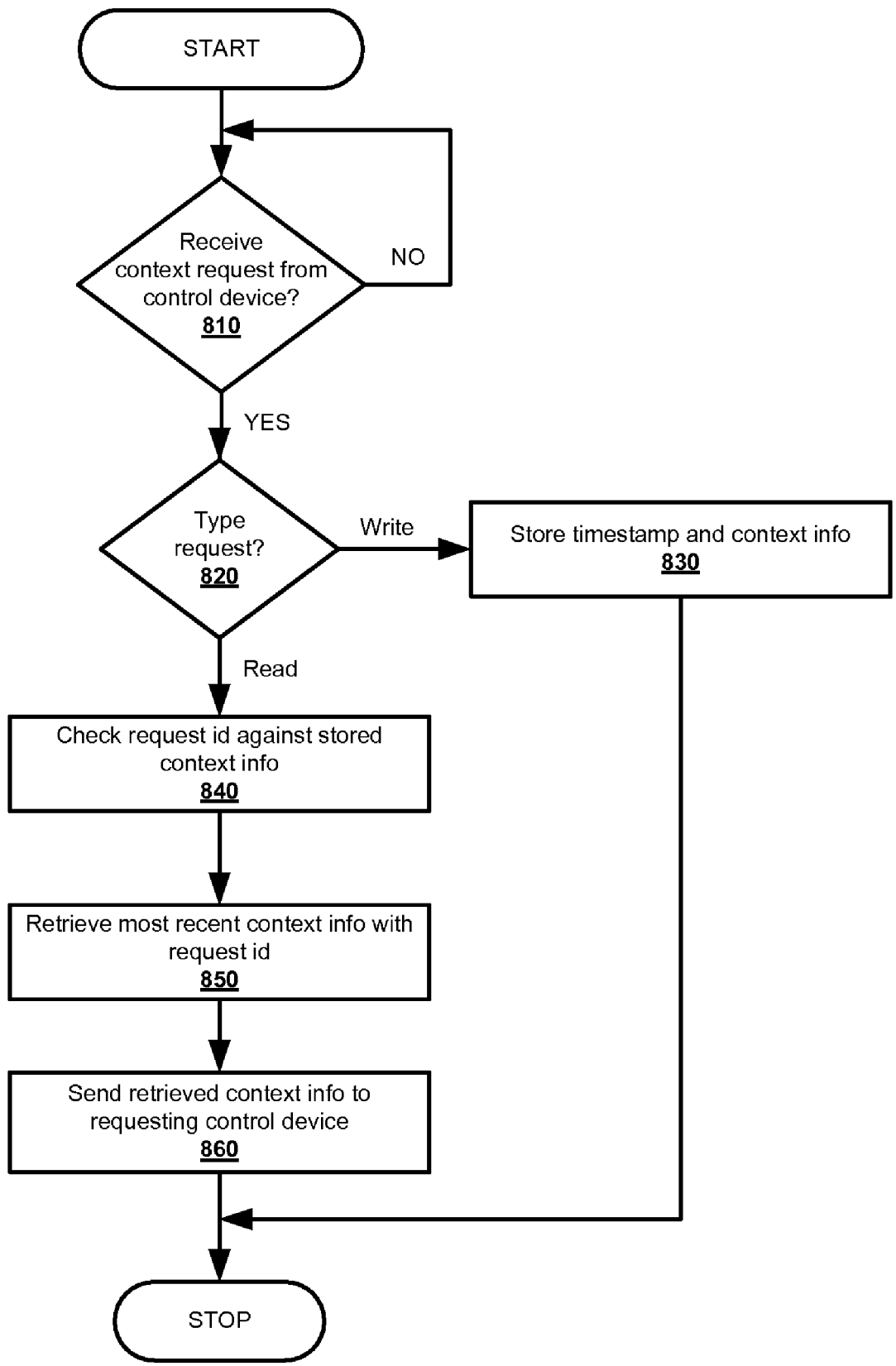
FIG. 8 is a flowchart of a method in accordance with another embodiment of the present invention.

FIG. 8 is a flowchart of a method for reading or writing context information in a partitioned context server according to an embodiment of the present invention. A context server may await (810) a request from a network control element.

The request from the control element may be broadcast to all the context servers in the partition. To enhance high speed performance, the context server need not acknowledge the request.

If the request is to write (820) the call signal just processed by the network control element to the context server, the context server may store (830) the timestamp, i.e., the time that the network control element received the call signal from a telecommunication switch, and the call signal, which includes the data key. In one embodiment, the context server may generate additional context information associated with the call signal and store that information for later use by the network control elements.

If the request is to read (820) context information from the context server about the call signal currently received by the network control element, the context server may check (840) previously processed call signals that are stored in the server database to identify those having the same data key as the request. If the context server has more than one previously processed call signal that matches the data key of the current call signal, the context server may retrieve (850) context information about the most recent of the previously processed call signals that match. If the context server only has one match, context information about that match may be retrieved. If there are no matches, the context server does not retrieve context information. The context servers may send (860) the retrieved context information to the requesting network control element.

Several embodiments of the invention are specifically illustrated and/or described herein. However, it will be appreciated that modifications and variations of the invention are covered by the above teachings and within the purview of the claims without departing from the spirit and intended scope of the invention.

What is claimed is:

1. A method comprising:
   determining, by a central server, a partition number for a call using a modulus algorithm based upon a data key of the call, the partition number corresponding to one or more context servers; and
   responsive to the determination, sending call data about the call to context servers in a partition corresponding to the partition number.

2. The method of claim 1, wherein the partition number P is equal to (K mod Y) +N, where K is based upon the data key, Y is the number of partitions, and N is an integer.

3. The method of claim 1, wherein the determining comprises:
   calculating the partition number based on the data key;
   searching a partitioning table for the calculated partition number, wherein the partitioning table maps each partition number to a partition and the corresponding one or more context servers in the partition; and
   identifying, from the partitioning table, the context servers in the partition mapped to the calculated partition number.

4. A method comprising:
   determining, by a central server, a partition number for a call using a modulus algorithm based upon a data key of the call, the partition number corresponding to one or more context servers; and
   responsive to the determination, sending a request for context information about the call to context servers in a partition corresponding to the partition number.

5. The method of claim 4, wherein the partition number P is equal to (K mod Y) +N, where K is based upon the data key, Y is the number of partitions, and N is an integer.

6. The method of claim 4, wherein the determining comprises:
   calculating the partition number based on the data key;
   searching a partitioning table for the calculated partition number, wherein the partitioning table maps each partition number to a partition and the corresponding one or more context servers in the partition; and
   identifying, from the partitioning table, the context servers in the partition mapped to the calculated partition number.

7. The method of claim 4, further comprising:
   if re-partitioning is in progress,
   determining an old partition number for the call based upon the data key of the call, the old partition number corresponding to one or more context servers, and
   responsive to the determination, sending a request for context information about the call to context servers in an old partition corresponding to the old partition number.

8. The method of claim 7, wherein the old partition number $P_{old}$ is equal to (K mod X) +N, where K is based upon the data key, X is the number of old partitions, and N is an integer.

9. A method comprising:
   responsive to a change in network condition, partitioning, by a central server, a plurality of context servers into partitions, each partition including one or more context servers;
   generating, by the central server, a partitioning table that maps each partition to a partition number and the one or more context servers in the partition; and
   providing partitioning logic to determine a partition number for a call based upon a data key of the call.

10. The method of claim 9, wherein the partitioning logic includes a deterministic mathematical function that calculates a partition number based on the data key.

11. The method of claim 9, further comprising:
    transmitting the partitioning table and the partitioning logic to a plurality of network control elements that receive calls having data keys.

12. The method of claim 9, further comprising:
    determining whether the change in network condition has occurred.

13. The method of claim 12, wherein the determining comprises:
    receiving a signal that the change in network condition has occurred.

14. The method of claim 12, wherein the determining comprises:
    monitoring network parameters; and
    determining that the change in network condition has occurred based on the monitored network parameters.

15. A system comprising:
    a plurality of context devices configured to provide context information about call messages;
    at least one partitioning device configured to, responsive to a change in network condition, partition the context devices into a plurality of partitions, wherein each partition includes one or more of the context devices; and
    at least one control device configured to select a partition based on the call messages and to access the one or more context devices in the selected partition regarding the context information.

16. The system of claim 15, wherein the partitioning device is configured to:
    provide partitioning logic based on the call messages to the control device to be used to select the partition.

17. The system of claim 15, wherein the control device is configured to:

access the one or more context devices in the selected partition to send context information or to receive context information.

18. A method comprising:

receiving, from a telecommunications switch, a call message that pertains to a call;

determining to which partition of context servers to send a request for information about previously processed call messages that pertain to the call;

sending the request for information to the context servers in the determined partition;

receiving the information from the context servers; and processing the call message based on the information received from the context servers.

19. The method of claim 18, wherein the determining comprises:

calculating a partition number based on a data key included in the request; and identifying the context servers in the partition having the determined partition number.

20. The method of claim 18, further comprising:

determining to which partition of context servers to send the processed call message for later retrieval in response to a subsequent request for information; and sending the processed call message to the context servers in the determined partition.

* * * * *